United States Patent
Hobbs

(10) Patent No.: US 7,516,255 B1
(45) Date of Patent: Apr. 7, 2009

(54) METHOD AND APPARATUS FOR PROVIDING A LOW-LATENCY CONNECTION BETWEEN A DATA PROCESSOR AND A REMOTE GRAPHICAL USER INTERFACE OVER A NETWORK

(75) Inventor: David V. Hobbs, Surrey (CA)

(73) Assignee: Teradici Corporation, Burnaby, British Columbia (CA)

( * ) Notice: Subject to any disclaimer, the term of this patent is extended or adjusted under 35 U.S.C. 154(b) by 493 days.

(21) Appl. No.: 11/284,676

(22) Filed: Nov. 21, 2005

Related U.S. Application Data

(60) Provisional application No. 60/667,157, filed on Mar. 30, 2005.

(51) Int. Cl.
G06F 13/12 (2006.01)
G06F 3/00 (2006.01)
H04N 7/00 (2006.01)

(52) U.S. Cl. .................... 710/72; 710/61; 715/700; 348/474

(58) Field of Classification Search ............... None
See application file for complete search history.

(56) References Cited

U.S. PATENT DOCUMENTS

| 3,952,296 | A | * | 4/1976 | Bates | 345/559 |
| 5,768,533 | A | | 6/1998 | Ran | 395/200.77 |
| 6,014,694 | A | | 1/2000 | Aharoni et al. | |
| 6,633,934 | B1 | | 10/2003 | Thornton | 710/100 |
| 6,664,969 | B1 | | 12/2003 | Emerson et al. | 345/544 |
| 6,671,756 | B1 | | 12/2003 | Thomas et al. | |
| 6,701,380 | B2 | | 3/2004 | Schneider et al. | |
| 2002/0149617 | A1 | | 10/2002 | Becker | |
| 2002/0199047 | A1 | | 12/2002 | DuPont et al. | |
| 2003/0177172 | A1 | | 9/2003 | Duursma et al. | 709/203 |
| 2003/0191860 | A1 | | 10/2003 | Gadepalli et al. | |
| 2003/0208779 | A1 | | 11/2003 | Green et al. | 725/143 |
| 2004/0015991 | A1 | | 1/2004 | Thornton | |
| 2004/0062305 | A1 | | 4/2004 | Dambrackas | |
| 2004/0080526 | A1 | | 4/2004 | Thornton | |

OTHER PUBLICATIONS

Thekkath, Chandramohan et al., "Limits to Low-Latency Communication on High-Speed Networks," *ACM Transactions on Computer Systems*, vol. 11, No. 2, pp. 179-203, May 1993.
Nieh, Jason, "A Comparison of Thin-Client Computing Architectures," *Technical Report CCUCS-022-00*, Network Computing Laboratory, Columbia University, 16 pages, Nov. 2000.
Stegmaier, Simon et al., "A Generic Solution for Hardware-Accelerated Remote Visualization," *Joint EUROGRAPHICS—IEEE TCVJ Symposium on Visualization*, eds. Brunet and Navazo, pp. 87-94, 2002.
Yang, S. Jae et al., "The Performance of Remote Display Mechanisms for Thin-Client Computing,," *Proceedings of the 2002 USENIX Annual Technology Conference*, pp. 1-16, Jun. 2002.

* cited by examiner

Primary Examiner—Alan Chen
(74) Attorney, Agent, or Firm—Moser IP Law Group

(57) ABSTRACT

A pair of processing modules and methods that enable low latency communications between a data processing system and devices located at a remote graphic user interface across a standard shared network in accordance with the present invention is disclosed. The present invention provides a method for communicating graphics data in a synchronous manner from the data processing system to the user. This method is used in conjunction with a feedback error recovery method to provide lossless, low-latency communications of graphics data across the network.

25 Claims, 7 Drawing Sheets

METHOD AND APPARATUS FOR PROVIDING A LOW-LATENCY CONNECTION BETWEEN A DATA PROCESSOR AND A REMOTE GRAPHICAL USER INTERFACE OVER A NETWORK

RELATED APPLICATION

This application claims priority to U.S. provisional patent application Ser. No. 60/667,157, entitled, "Methods and Apparatus for Physically Separating the User Interface Devices of a Computing System from the Data Processing and Storage Elements of the Computer System and Transferring the Required Signals over a Standard Network," filed Mar. 30, 2005, which is co-pending, and incorporated herein by reference in its entirety.

FIELD

The present invention relates generally to the methods and apparatus for remotely accessing and operating the data processing component of a computer system. The invention has particular application to separating a user interface from a data processing component, placing the data processor in a different location and providing a low latency connection between them using a standard network.

BACKGROUND

Historic advances in computer technology have made it economical for individual users to have their own computing system, which caused the proliferation of the personal computer (PC). Continued advances of this computer technology have made PCs very powerful but also complex and difficult to manage. For this and other reasons, there is a desire in many workplace environments to separate user interface devices, including the display and keyboard, from the application processing parts of the computing system. In this preferred configuration, user interface devices are physically located at the desktop, while processing and storage components of the computer are placed in a central location. The user interface devices are then connected to the processor and storage components over a computer network.

A number of methods and devices have been developed to physically separate the user interface from the data processor using either proprietary transmission links (e.g. fiber) or dedicated digital links (e.g. standard CAT5 data cabling independent from the corporate LAN cabling). Examples of these methods include disclosures by Green et al. in U.S. Patent Application 20030208779 and Thornton in U.S. Pat. No. 6,633,934. Furthermore, commercial keyboard video and mouse (KVM) systems offered by Avocent and others provide similar capabilities. All of these physical layer extension methods are incompatible with existing workplace networks and therefore do not fulfill the primary objective of lowering infrastructure and maintenance costs by supporting remote users over the LAN infrastructure.

In order to understand the impact that a separated user interface may have on human perception, it is helpful to understand the system behavior for each existing method from the perspectives of system latency and quality of the visual experience. Shortcomings in prior art techniques are identified through an explanation of how these methods manage the communications of the graphics data to the remote display.

FIG. 1 illustrates the graphics path of a traditional PC. A graphical image is displayed after a sequence of events occurs. First, a software application running on data processor 10 sends graphic or drawing commands to operating system (O/S) 11. O/S 11, a graphics driver and graphics hardware then process these commands and generate an image that is stored in frame buffer 12. Display controller 13 monitors frame buffer 12 and sends the image to display 14 as a raster sequence. This raster sequence is periodically refreshed. Whenever the contents of frame buffer 12 are changed by the application, the modified image is sent to display 14 the next time display controller 13 reads that part of frame buffer 12. To create smoother image transitions, an application or O/S 11 may synchronize its image updates with the raster timing of display controller 13.

There are three basic methods of communicating the display image from a data processor across a standard network to a remote display. The first method is referred to herein as the graphics command transfer method. Rather than being drawn on the data processor, the graphics commands from an application are transferred over a network to a user interface served by a remote computing system. The remote computing system's O/S, graphics driver and hardware execute the graphics commands to create an image that is stored in a remote frame buffer. The remote display controller reads the image from the remote frame buffer and sends it as a raster to the remote display. There are a number of variations on this technique. The X Windows™ interface is one example of an application that acquires graphics commands at a high level and transfers them to a remote user interface. A second example is Remote Desktop Protocol (RDP) that converts most of the graphics commands to simple low-level primitives before transferring them to the remote user interface.

In the case of a simple remote computing system, the graphics command transfer method works adequately for transferring simple images. A few simple graphics commands are communicated across the network and the resultant network traffic is low. However, for complex images, the number of commands needed increases significantly. This increases network traffic and system latency. Additionally, the image commands also become complex. This increases the required complexity of the remote computing system (i.e. O/S, graphics driver and hardware). This in turn increases the cost, maintenance and support requirements for the remote user interface, in direct conflict with the original motivation for centralization—reduced support requirements for remote computers.

To accommodate low-complexity remote user interfaces, an alternate graphic command transfer method that may be used. This method converts the graphics commands to simple commands before transferring them. One problem with this method is that overall graphics capabilities are severely constrained by the low-complexity graphics capabilities of the remote system. This is due to high-level graphic commands that leverage graphics hardware acceleration functions in typical computing platforms no longer available in the simplified command set.

A second problem is that converting commands to simple commands is performed by the data processor and is a processing intensive function. The result is that the conversion process slows down the data processor and reduces the performance of the system.

A variation on the graphic command transfer method is disclosed by Duursma et al. in U.S. Patent Application 20030177172 entitled "Method and System for Generating a Graphical Display For a Remote Terminal Session." In this approach, an application is capable of recognizing screen images components as either being graphic commands or bitmaps. Graphic commands are handled similarly to the method described above. However, when a bitmap is identified, a compressed data format of the bitmap is retrieved and transmitted to the remote terminal session in place of the original bitmap. While this feature adds bitmap capabilities to the command transfer method, the command processing overheads persist so little overall improvement to the graphics command processing is realized.

The second method for separating the user interface from the data processor referred herein as the frame buffer copy method. This method solves the drawing performance problem described above by using the O/S, graphics driver and hardware acceleration to draw the image into the frame buffer on the data processor side of the network. The image is then copied to a remote frame buffer at the remote user interface. This frame buffer is then read by the remote display controller and sent as a raster to the remote display.

Given that there is no direct network connection to the frame buffer, various methods exist to overcome the problem of transferring the image from the source frame buffer to the remote frame buffer. For example, virtual network computing (VNC) provides a solution that uses a software application at each end. An application on the data processor side reads the frame buffer, encodes the image and then sends it to the decoder application at the remote user interface where it is decoded by the VNC application and written into the remote frame buffer.

To reduce latency associated with updating image changes, the encoder continuously monitors the frame buffer and immediately sends any updates to the decoder. The biggest problem with this technique arises during times of complex image generation. Given the encoder software runs on the same processor as the drawing application, the processor becomes loaded with both encoding and drawing operations, which slow down the drawing speed and degrades the user experience.

A second problem with this method arises as a result of multiple, asynchronous frame buffers. When areas of the remote frame buffer are updated out of synchronization with the source frame buffer, the image viewed at the remote display is different from the intended image in the case of the display being connected directly to the source frame buffer.

A variation on the VNC software method is a server management product disclosed under U.S. Pat. No. 6,664,969 to Emerson, et al., entitled "Operating System Independent Method and Apparatus for Graphical Remote Access." Emerson uses a separate hardware module to read the frame buffer, compress and send the image to an application at the remote user interface. This variation removes the encoding software load, but consumes the system bus of the data processing sub-system each time the frame buffer is read. In cases where real-time frame updates are required, the load on the system bus directly compromises the performance of the data processor and slows down the application. As with the VNC software method, this method has display continuity problems associated with synchronizing multiple frame buffers or pointers.

To provide a positive user experience, PC architecture has been designed for a well-timed image interface at the display controller output. Therefore, the best existing techniques are derived from the image being captured at this point. By obtaining the image at the display controller output, these implementations solve the problem of loading the processor, but also introduce additional problems.

A third method for separating the user interface from the data processor is referred to herein as the frame capture and transfer method. In this approach, the display controller of the data processor outputs a standard analog video signal. A frame capture circuit samples the video signal and captures the image into a capture frame buffer, one frame at a time. The image in the capture frame buffer is then transferred over the network to the remote frame buffer. The transfer operation is performed by an image-encoding application that accesses the capture frame buffer and compresses the image before sending it over the network. An application at the remote end decompresses the image and writes it into the remote frame buffer. This solution is suitable for applications where not all frames need to be processed or when the processing is allowed to take multiple frames.

However, a significant shortcoming of this approach is high delay and bandwidth consumption that is introduced into the display path when every frame image is captured and then processed out of the capture frame buffer memory. Another problem with this method is that frame-capture circuits lack the ability to detect the image characteristics, such as sampling frequency, image size and timing. Rather, these frame capture circuits have predefined capture timing and do not adapt to the changeable image stream characteristics defined by the display controller.

Yet another shortcoming of this solution is that frames are dropped or repeated and images may be torn where the display shows half of one frame and half of a previous frame. These undesirable effects are a result of two independent display controllers operating from different clocks. Even when set to the same frequency, clock variations result in the display controllers on each side of the network running at slightly different refresh rates.

Also, current implementations of this approach use analog connections, which is subject to sampling errors and creates noise. The noise introduces significantly more data to be transferred across the network, further increasing system latency.

A major shortcoming shared by this approach and others described above is that the image cannot be optimized to the capabilities of the display. Specifically, given there is no bi-directional connection between the display controller of the data processing system and the remote display, the display controller is unable to detect the display's capabilities.

The disadvantages of the prior art limit the usefulness of the frame capture and transfer method to low performance support or administrative computer systems with low-resolution displays.

Finally, another prior approach is to use a video encoder to capture every frame of a video stream and compresses it for storage or transmission. The first problem with this video encoder method is that it does not provide the same spectrum and resolution of a computer display because of its incompatibility with the RGB signals used in a computer display. Rather, the video encoder works with video luminance and chrominance signals.

The second problem with the method is that it uses lossy video compression techniques, which are not suitable for some of the images found in a computer display. The third problem with this method is the compression methods introduce multiple frame delays whereas the delay introduced by an encoding system must only be a fraction of a frame period. The fourth problem with video encoders is they do not support the full range of image sizes available for a display controller or a computer monitor. Rather they work with predefined image sizes. The fifth problem with this method is similar to a problem described for other methods. It is a broadcast method that captures a defined image size and frame rate and therefore does not allow the display controller to query the remote display and adjust its timing, frame rate or size to match the display.

In addition to the shortcomings described above, the physical network impacts the data transfer and consequently the user experience. Standard corporate LANs use packet-based methods for data communications, which adds additional performance constraints when applied to high-data video and graphics applications. There are two protocols available for data communications over a standard packet network. The first is the connection-oriented TCP protocol that guarantees the delivery of the information at the expense of data transfer performance. The second protocol is the connectionless UDP protocol that is preferable for real-time communications due to higher throughput. However UDP does not guarantee the delivery of data across the network. The frame transfer methods described above inherently lack real-time performance and therefore can afford the additional latency associated with using TCP protocol for graphic transfers.

The communication of real-time images over packet networks using connectionless protocols such as UDP is common practice in video communications including video conferencing and video content delivery across the Internet. H.261 and MPEG4 are examples of standards for supporting these applications. To minimize the effects of network-induced data loss, these protocols incorporate forward error correction methods and redundancy mechanisms. These protocols also incorporate data reduction methods. For example, rather than transmitting every frame associated with a video sequence, the MPEG protocol transmits an intra-coded reference image known as an I-Frame followed by a series of change vectors based on a future predicted frame. The decoder then builds a series of sequential frames using much less data than if each frame were transferred independently across the network.

The greatest shortcoming of this approach is that erroneous data may be used as the baseline for future frames causing errors to be propagated into these future frames and resulting in the display of distracting artifacts. These lossy compression techniques used are suitable for video but not for high definition graphics of computer displays. A second problem is that some encoding schemes introduce further communication latency that further degrades the user experience for a computer remote user interface.

One approach to limiting residual error propagation involves transmitting the graphics image as a sequence of sub-frames and using a feedback command channel to authorize the retransmission of corrupt or lost sub-frames. Such a technique is disclosed by Ran in U.S. Pat. No. 5,768,533 entitled "Video Coding Using Segmented Frames And Retransmission to Overcome Channel Errors." In this approach, the receiver waits for all of the sub-frames that make up an image to be correctly received and then displays the frame. This may be an adequate method for some wireless video applications but the lack of display synchronization between the original video signal and the display frames introduces jitter and adds variable latency which makes it unsuitable for remote computer displays.

SUMMARY

The present invention solves the problems described above and allows the data processor of a computer system to be separated from the user interface using a standard shared network while interaction latencies between the user interface and the data processor are actively controlled below the threshold of human perception.

The present invention provides methods and apparatus that provide structured communications between the remote user interface devices and the data processor. According to one aspect of the present invention, a pair of processing modules enable communication across a standard shared network between the data processing system and the devices located at the remote user interface where one processing module is located at the data processor and the other is located at the remote user interface. The module located on the data processor end of the network connects to the system bus, I/O signals and the raster video output signal of the data processor. The module located on the user interface end of the network and connects to user devices and a display. In the preferred embodiment of the invention, the two processing modules communicate with each other across a standard IP/Ethernet network. In this preferred embodiment, the display interface is a DVI signal and the user devices include audio devices, USB peripherals and standard PC I/O signals. By enabling communications over an IP/Ethernet network, this aspect of the invention overcomes the problems associated with the non-standard networking approaches described above.

In another aspect, the present invention utilizes a method that provides a low latency communication bridge for the display signal from the data processor to the remote graphic user interface. In a preferred embodiment, a connectionless network protocol is used in conjunction with a data sequencing method and a transmission timing method. By monitoring sequence and timing, this aspect of the present invention minimizes transmission latencies and perceptible loss in quality of the original display signal based on network availability. This method of the present invention overcomes the delay limitations of the low performance command transfer and frame capture techniques described. Furthermore, a significant improvement is offered over fixed bandwidth methods described above such as the video encoding technique that, in the face of network congestion, drops content, loses I/O functions or stops working altogether.

In a third aspect, the present invention provides a remote display synchronization method that controls the timing of the remote display. In a preferred embodiment, the method involves setting the timing of the remote display to that of the video source at the data processor and repeatedly adjusting the phase of the display controller to maintain the minimum image transfer delay. This aspect of the present invention overcomes the display jitter and tearing problems associated with some of the frame buffering methods discussed in the background section while minimizing display latency.

In yet another aspect, the present invention provides a data recovery method that uses sub-frame partitioning and feedback to minimize the effects of transmission errors. In accordance with the preferred embodiment, the method uses the sequencing protocol to determine the newest image compilation for display, establishes and requests replacement data requirements from the data sequence information, and displays frame updates based on an optimized blend of new data and historic information. In this aspect, the present invention overcomes the display jitter and latency problems described above.

By providing a single standard network interface between a data processor and a remote user interface, the invention reduces the cost over proprietary methods while the low latency methods discussed ensure a better user experience than other standards-based techniques.

Additional features and advantages of the present invention will be realized by reading the following detailed description, when considered in conjunction with the accompanying drawings, in which:

DETAILED DESCRIPTION

Figure 1:
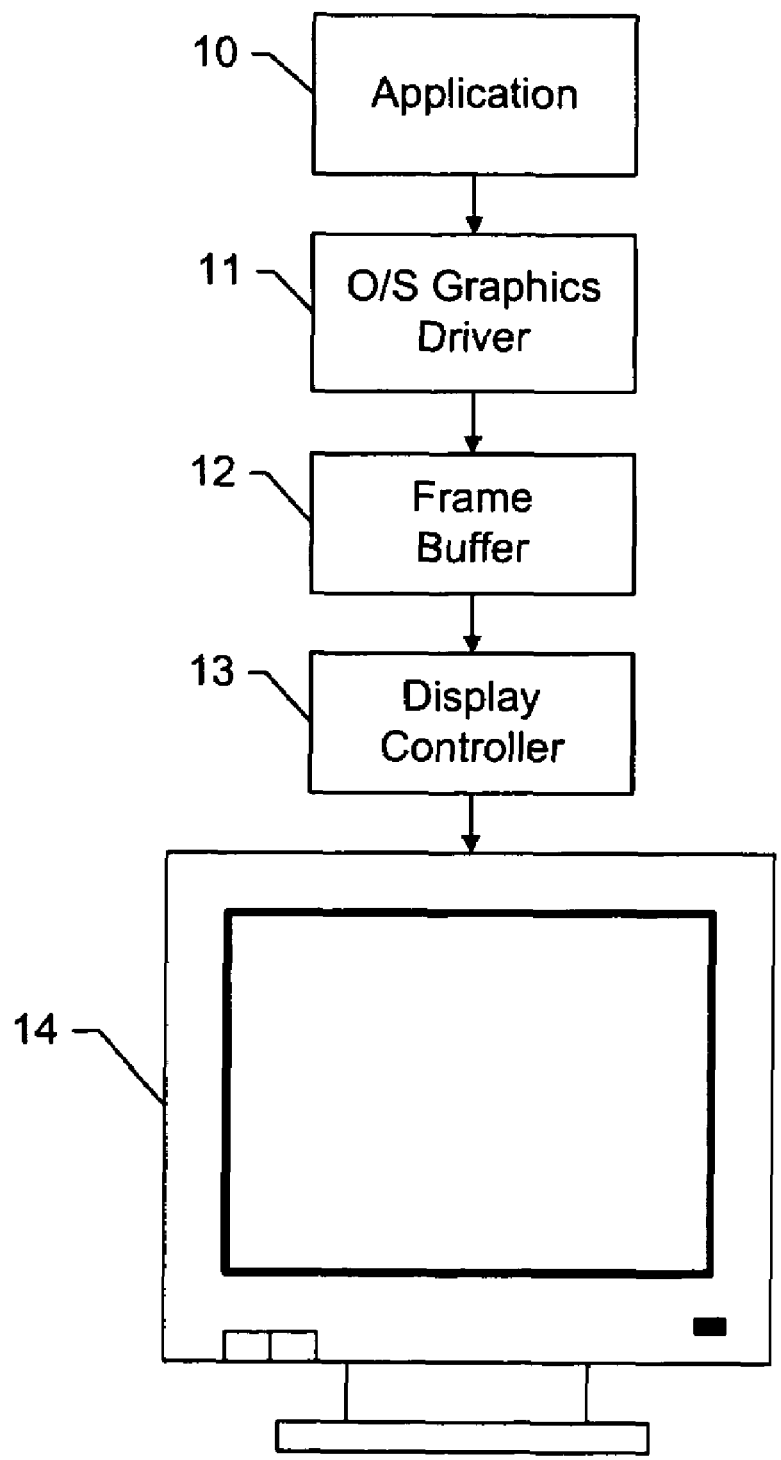
FIG. 1 is a block diagram of the graphics pipeline of a traditional data processor system.
Figure 2:
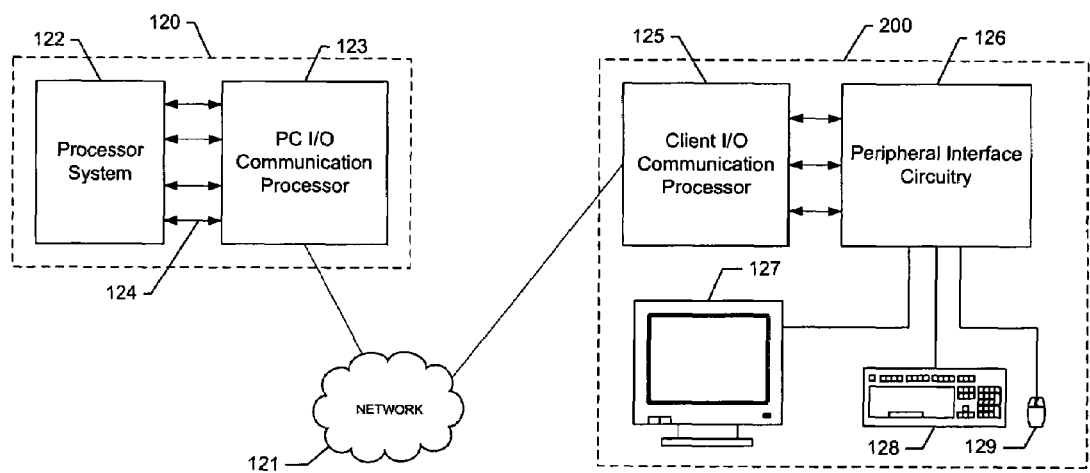
FIG. 2 is a diagram illustrating one embodiment of the invention incorporating a Blade PC on one end of a network and a remote client on the other end of the network.

A preferred embodiment of the invention is illustrated in FIG. 2. Blade PC 120 located one end of network 121 includes data processing system 122 connected to PC I/O communication processor (PCIOCP) 123 using multiple signal connections 124 which include signals such as DVI, PCM, PCI and others. Remote client system 200 is located at the other end of network 121 and includes client I/O communication processor (CIOCP) 125 connected to peripheral devices normally found connected to a desktop PC via peripheral interface circuitry 126. These peripheral devices include display 127, keyboard 128, pointing device 129 and may also include other peripherals.

Figure 3:
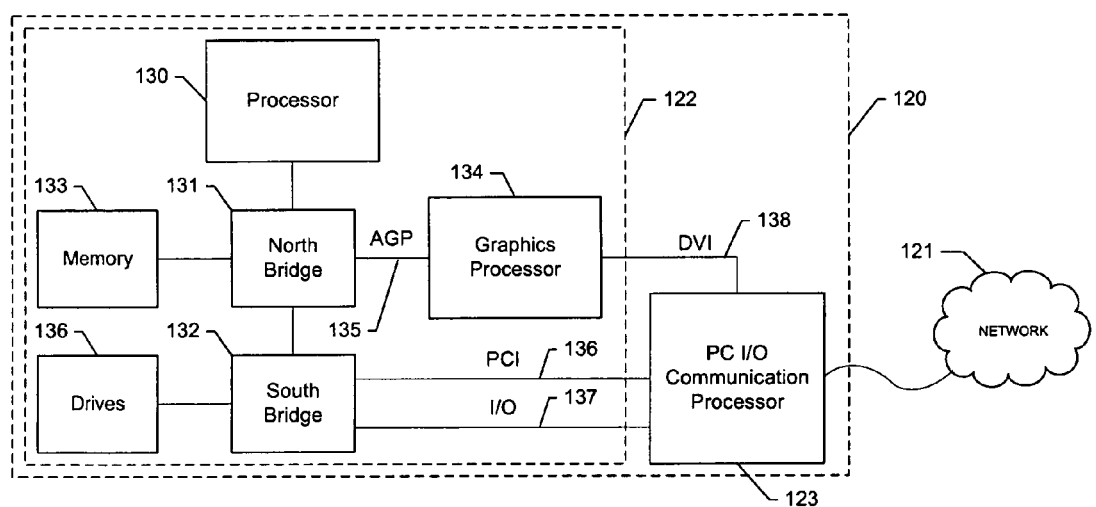
FIG. 3 is a detailed architecture of the blade PC showing the interaction of standard processing elements with a PC I/O communications processor

FIG. 3 shows a block diagram of blade PC 120 with its connection to network 121. Blade PC 120 has data processing system 122, typically found in a desktop PC and PCIOCP 123. Data processing system 122 includes processor 130. Processor 130 is connected to the PC chipset, which includes north bridge 131 and south bridge 132. North bridge 131 provides a connection from processor 130 to memory 133, south bridge 132 and graphics processor 134. North bridge 131 provides the necessary high bandwidth connection between these devices. The connection between north bridge 131 and graphics processor 134 is a high bandwidth interface such as AGP or PCI-Express 135. South bridge 132 is an I/O hub that provides the connection to PC I/O including audio, keyboard, mouse, printers and other I/O. South bridge 132 may also have connections to hard drives 136 or, alternatively, all hard drive storage may be accessed over the network.

There are a number of variations on the described PC data processing circuitry. Some processors include north bridge functions while other north bridge devices include the graphics processor. Some PC digital circuitry includes more processors, more graphics processors or more I/O devices. All of these are valid configurations of PC digital circuits for a blade PC. The requirements for the blade PC are that it includes processor 130, memory 133, graphics processor 134 and expansion bus 136. Graphics processor 134 may be substituted with a display controller with equivalent interfaces. In an embodiment, graphics processor 134 includes both a drawing processor that assists in the drawing of the image and a display controller that sequences the image out the display output 138. In another embodiment, the drawing processor may be absent and the image may be drawn entirely by processor 130. In either case, a display controller provides the image display sequence that needs to be communicated over the network. Other I/O 137 may be included with the processing chip set or as additional I/O devices.

The output of graphics processor 134 is DVI signal 138 that would normally be connected directly to a computer monitor. Instead, in the preferred embodiment, the DVI signal is connected to PCIOCP 123, which is capable of communicating the DVI signal across the network to the remote client. Because the DVI signal is digital, it may be converted into packets of data and sent across a standard packet network to be reproduced as a matching DVI signal at the remote client.

Figure 4:
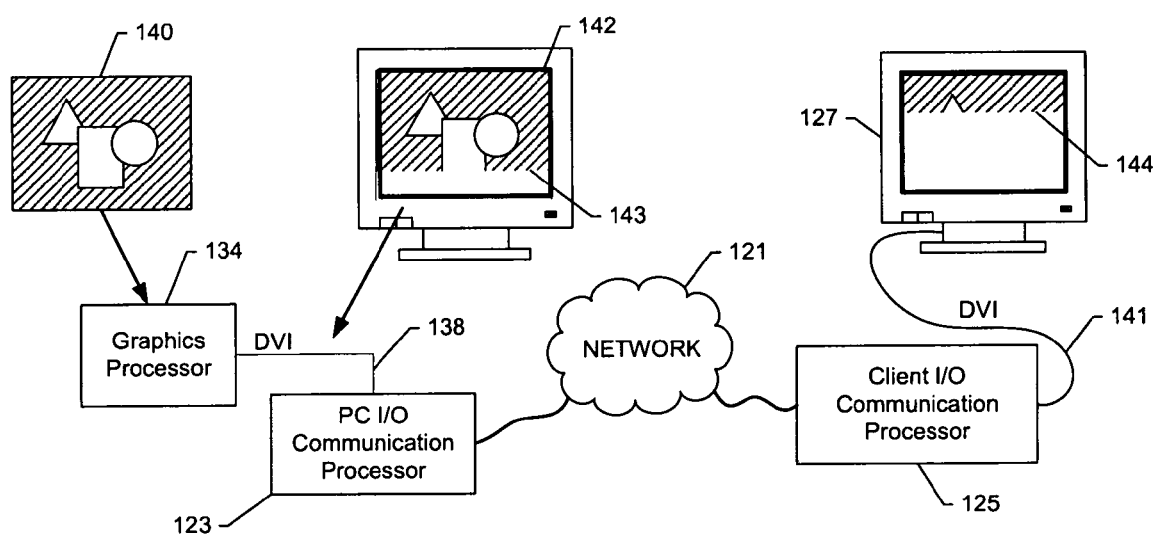
FIG. 4 illustrates a method in which the PC I/O communications processor and client I/O communications processor are used to synchronize the digital raster that drives the remote display with the digital raster generated by the graphics processor.

FIG. 4 illustrates how an image is created and transferred from blade PC 120 to a remote client using PCIOCP 123 and CIOCP 125. Image 140 is created by graphics processor 134 and output on DVI signal 138 as a digital raster signal. Image 140 is created by graphics processor 134 and output as DVI signal 138. This DVI signal is then fed into the PCIOCP 123 where it is encoded and put into packets. It is then transmitted across network 121 to the CIOCP 125 where it is converted back into DVI signal 141.

FIG. 4 shows graphics processor 134 and CIOCP raster scan based DVI signals at a moment in time as they scan down the image. Graphics processor DVI signal 138 is shown ahead or further down image 143 than CIOCP DVI signal raster scan 144. In an embodiment, the two DVI signals at each end of the network are synchronized so that the remote client's DVI signal 141 is operating at a constant delay from blade PC DVI signal 138. PCIOCP 123 detects the frequency and phase of the graphics processor's DVI signal and communicates it to CIOCP 125. CIOCP 125 adjusts the frequency and phase of its DVI signal to be locked to the graphics processor DVI signal. This is accomplished through a series of acts. As a first act, PCIOP 123 detects the frequency of the incoming DVI signal (defined by resolution and refresh rate) by measuring the frame rate of the inbound DVI signal 138 to the accuracy of the crystal of PCIOP 123. PCIOP 123 communicates the frequency and a tunability range to CIOCP 125. CIOCP 125 uses the data to set its own frequency and range of required tunability. As a next act, CIOCP 123 receives the first scan line and initializes a scan line counter. CIOCP 125 starts displaying the image after a predefined number of scan lines have been counted. The total latency between DVI signal 138 and display signal 141 is then equivalent to the network latency and a predetermined jitter latency determined by the CIOCP counter. As a next act, the frequency of CIOCP 125 is periodically adjusted within the controllable range in order to lock the frame rates at a predefined lag. CIOCP 125 determines the difference between DVI scan line 138 and display scan line 141 and adjusts its frequency accordingly. If there is insufficient latency between the two scan lines, the display clock frequency is marginally decreased. In cases where the display rate cannot be increased quickly enough (for example to prevent display jitter), incoming packets or frames may need to be dropped. If the latency is too long, the display clock frequency is marginally increased. In an alternative embodiment, CIOCP 125 develops its timing independently.

By synchronizing blade PC DVI signals and the remote client's DVI signals, the image seen at the remote client can be exactly the same as the image seen if the display were connected to the DVI output of the graphics processor. Changes to the image occur in the same frame sequence at the remote client as they are created and displayed by the graphics processor. In addition to minimizing the delay, this prevents "tearing," an image display problem that occurs when the display frame rate is not synchronized with the image source. It also prevents the jitter seen in non real-time system where frames can be dropped or delayed when the image complexity increases.

With the blade PC and remote client DVI signals synchronized, the delay or latency caused by the communication processors and the network is managed more effectively. In a remote client system configuration where the network delay and packet loss is very low, the remote client display is delayed by less then one frame, or only the number of lines necessary to effectively compress the image. If the packet loss is high, but the latency is low, the delay is adjusted to allow for retransmission of packets.

The synchronized display structure is a significant improvement over the other remote user interface systems as it reproduces the desktop experience with no image or frame sequence change and only the delay introduced by the network and the encode and decode time. When compared to the graphics command transfer method described above, there is no delay introduced by having the data processor doing the encoding or the remote client having to draw the image.

The encoded DVI packet stream can be used to regenerate the DVI signal without loss at the remote client. However, if data is lost in the network, or for any other reason, the remote client may not have the ability to recreate the original DVI signal. The communication system does not guarantee lossless communications, but it does guarantee detection of lost data and retransmission of lost data.

Figure 5:
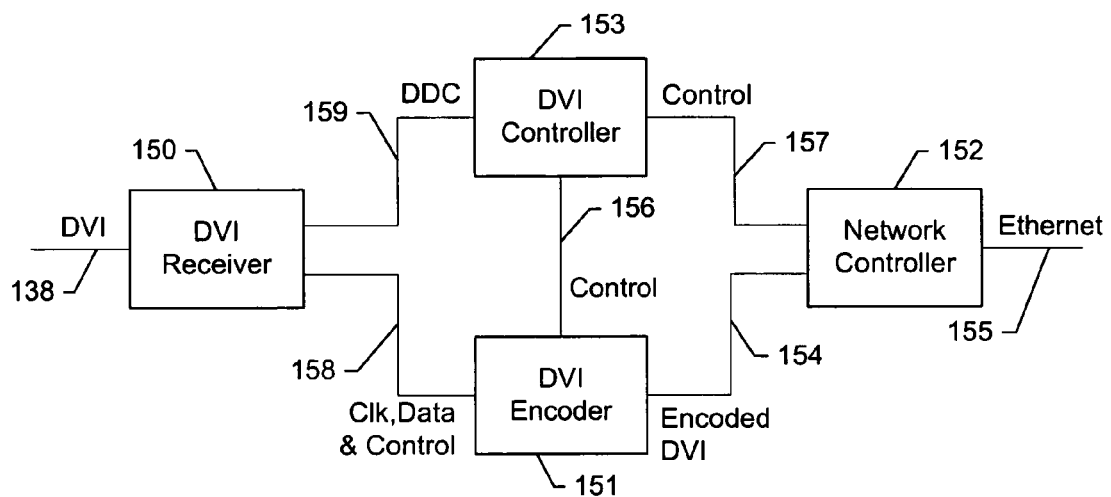
FIG. 5 is a block diagram showing the DVI encoding and control circuits inside the PC I/O communications processor.

The DVI encoding path on-PCIOCP 123 and the DVI decoding path on CIOCP 125 incorporate mechanisms to enable error recovery in the case of lost data. Referring first to the encoding path on PCIOCP 123 shown in FIG. 5, DVI receiver 150 receives DVI signal 138 from the graphics processor 134. DVI receiver 150 passes image stream 158 (including data, clock, and control signals) to DVI encoder 151. DVI receiver 150 also passes display control information 159 such as DDC control information to DVI controller 153. DVI encoder 151 converts the DVI stream into a stream of encoded pixel data 154, which is sent to network controller 152. DVI controller 153 manages DVI encoder 151 using control path 156 and communicates with network controller 152 for network status and as a communication channel to the remote client DVI controller using control path 157 as shown. Network controller 152 manages the stream of image data and sends it over network 155 to remote client system 200.

DVI encoder 151 partitions each raster frame generated by partitioning the DVI signal into a series of block or tile partitions. Sequence information is added to the encoded DVI data, so that the remote client can detect loss data and request corrections. DVI controller 153 maintains the sequence information for each partition of the DVI signal.

Figure 6:
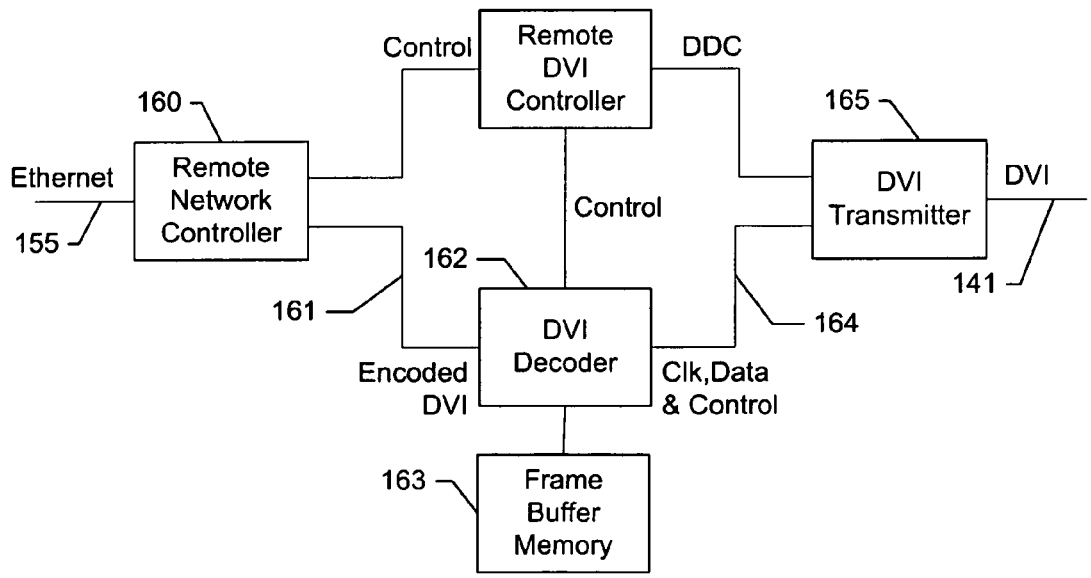
FIG. 6 is a block diagram showing the DVI decoding and control circuits inside the client I/O communication processor.

Now referring to the decoding path of CIOCP 125 illustrated in FIG. 6, remote network controller 160 receives the packets sent over network 155 from PCIOCP 123. Encoded DVI data 161 is sent to DVI decoder 162 where it is queued for decoding. If the data is received in advance of when the updated image is required and the queue fills, the queue is extended into frame buffer/memory 163 until needed. The outputs from DVI decoder 162 are clock, data and control signals 164 that are a reproduction of signals seen at PCIOCP 123 in FIG. 5. These signals are sent to DVI transmitter 165 to be converted into DVI signal 141 that goes to the display.

In an embodiment, remote network controller 160 monitors the packet sequences and sends information back to PCIOCP 123 about the state of the packet and partition sequence. The information is sent using an acknowledging protocol with retransmission if it fails. When a replacement for a sequence number is requested by the remote client or an acknowledgement missed, DVI controller 153 determines which DVI signal partition was lost and commands the encoder to encode that partition on the next frame. This is accomplished by negating the unchanged indication for the lost partition. Only one sequence number is maintained for each partition. When a lost sequence number cannot be found in the partition list, it means that the associated partition has already been retransmitted and no action is required.

In cases where the network is congested and the network protocol forces delayed transmission of partition data, DVI controller 153 monitors both the transmission status of partitions in the queue and the incoming DVI raster signal. Should the partition be delayed by an entire frame and an updated version of the same partition information becomes available, DVI controller 153 refreshes the display queue with the updated partition data.

In cases where data is successfully transmitted and received but congestion causes the delayed arrival of the partition such that it cannot be decoded and written to the buffer ahead of access by the display controller, decoder 162 uses the control channel to signal the retransmission of that frame in an attempt to receive newer replacement data in time for the next frame. If the replacement data does not get there on time the delayed data can be used as it will be more accurate then leaving the display unchanged. In an embodiment, through pinging or the passing of control messages, DVI controller 153 knows how much time it has to encode and transmit the signal before it will be too late for the current refresh so it only sends replacement data if is likely to arrive in time.

An alternative to blade PC 120 is a standard desktop computer, a pedestal computer or a rack mount computer. Using a standard PCI or PCI-E card that contains PCIOCP 123, similar capabilities can be obtained by cabling the DVI signal to the card. In an embodiment, the remote client is implemented as a standard computer platform with a standard display. As most of the functionality is implemented at PCIOCP 123, many of functions performed by CIOCP 125 are implemented as software in a standard computer platform. This embodiment does not allow the same low latency performance because the remote computer does not have access or control over the real-time video signals.

Other embodiments of the present invention include systems that are not fully software independent. Some of the functions maybe implemented as driver software on the data processor or as software on a computer at the remote user interface. While this does not provide the same guaranteed real-time performance, it can be done to simplify some of the hardware required.

The present invention describes a lossless sub-frame encoding scheme for real-time graphical data transfer. Other embodiments of the invention include lossless or lossy data compression and encoding methods including progressive build methods, color compression methods and video or image compression methods.

While the invention refers to standard PC interfaces such as DVI, the method and apparatus works equally well with other display controller interfaces including analog interfaces and evolving digital standards such as HDMI, DPVL, DisplayPort, and the like.

Figure 7:
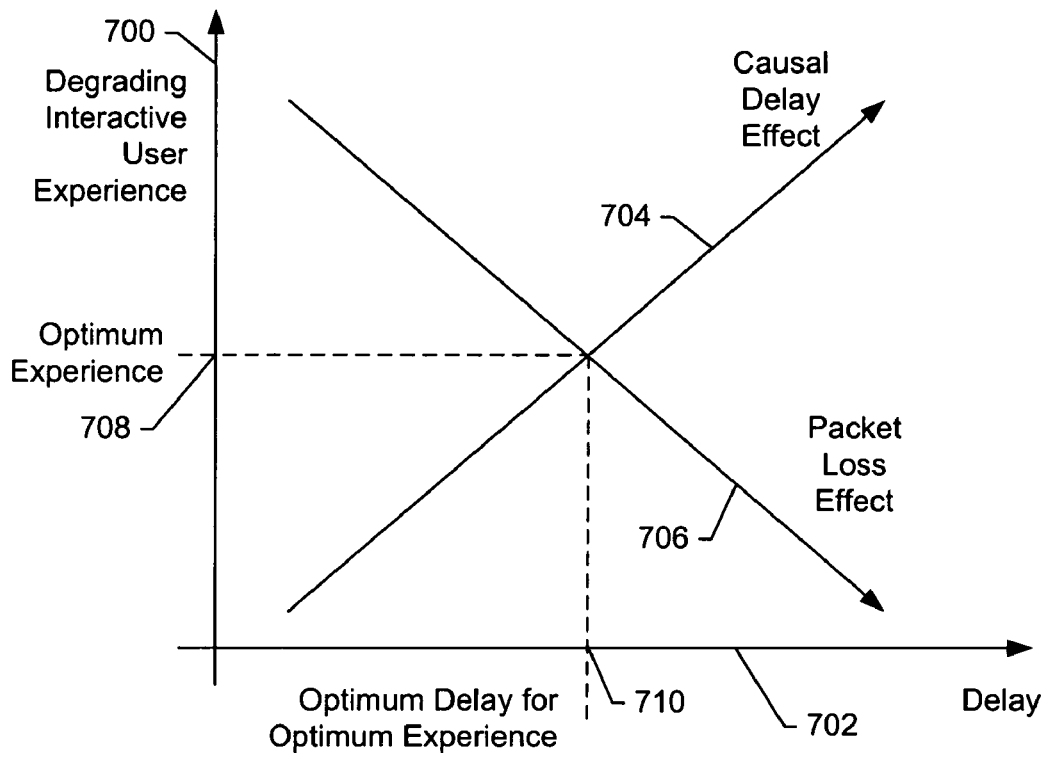
FIG. 7 is a graph showing the impact of total delay on user experience.

FIG. 7 is a graph showing the impact of total delay on user experience. Vertical Axis 700 represents a measure of the multi-modal interactive experience of a remote display system and horizontal axis 702 represents increasing delay as a sum of network delay and controlled delay. Plot 704 shows the causal delay effect for increased delay. As referred to herein, causal delay describes the system responsiveness of a remote user interface system during user interaction with respect to user interface lag. For example, the lag between when a mouse is moved and when the pointer appears to move is an example of causal delay. As the delay increases, so the causal delay effect increasingly degrades the user experience as shown.

Plot 706 shows the packet loss effect for increased network delay. As the network delay increases, the packet loss decreases and the user experience is improved due to improved accuracy in display image reproduction. Optimum user experience 708 may be found by adjusting the controlled portion of the delay and establishing the point where packet loss effect 706 is balanced against causal delay effect 704 (i.e. the intersection of the curves). Measurement of the causal delay requires knowledge of the round trip response of the network. One method of determining the nominal round trip network latency is by pinging the host system from the client system. An alternative approach where the round trip delay response time of the network is unknown is to measure the slope of the packet loss effect curve by measuring the relative packet delay as described below.

Figure 8:
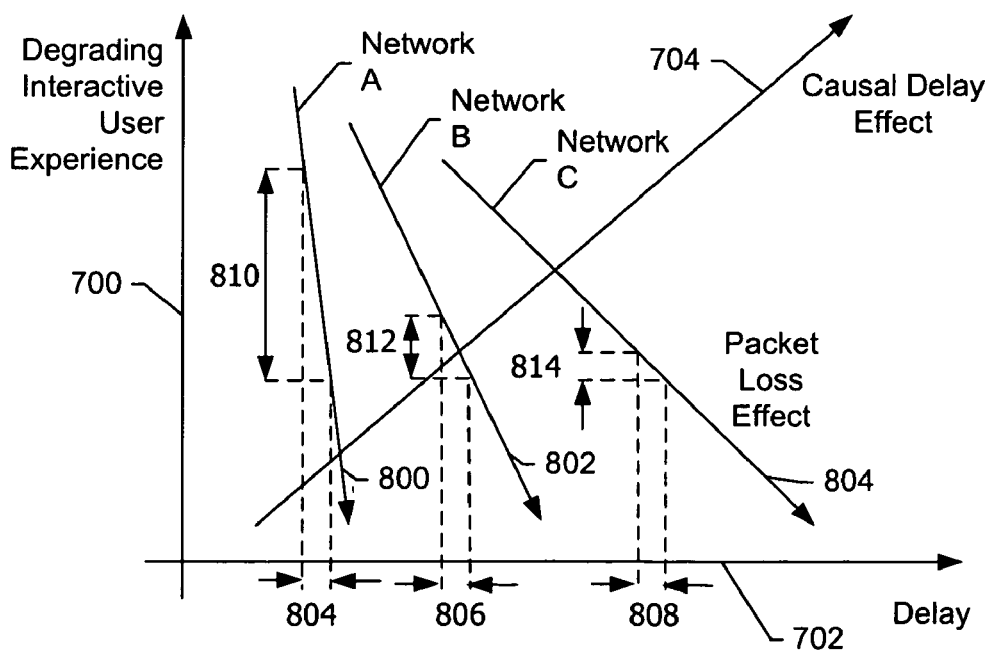
FIG. 8 shows the packet loss effect for a low delay network, a medium delay network and a high delay network.

FIG. 8 shows the packet loss effect for three different networks. Plot 800 shows a low delay network; plot 802 shows a medium delay network and plot 804 shows a high delay network. As shown, low delay networks are characterized by steeper loss effect curves than high delay networks. The impact is that delay change 804 has much greater interactive user experience impact 810 on low delay network 800, than same delay change 806 causing less impact 812 on network 802 or same delay change 808 causing even less impact 814 on high delay network 804.

The slope of the packet loss curve is determined by monitoring the relative arrival times for each packet in a sequence of transmitted packets and comparing the relative delay histogram for the packet sequence with a series of predetermined relative delay histograms stored in local memory. Each predetermined relative delay histogram correlates with a different packet loss curve and an associated optimum scan counter value (related to the optimum delay for that curve) which is also stored in memory 19. In an embodiment, a database or list of scan line offset values is maintained in memory 19. The list of scan line offset values contains scan line offset values read from stored relative delay histograms that have matched a formed relative delay histogram. In an embodiment, the list includes most-recently-used scan line offset values. In another embodiment, the list includes most-often-used scan line offset values.

Figure 9:
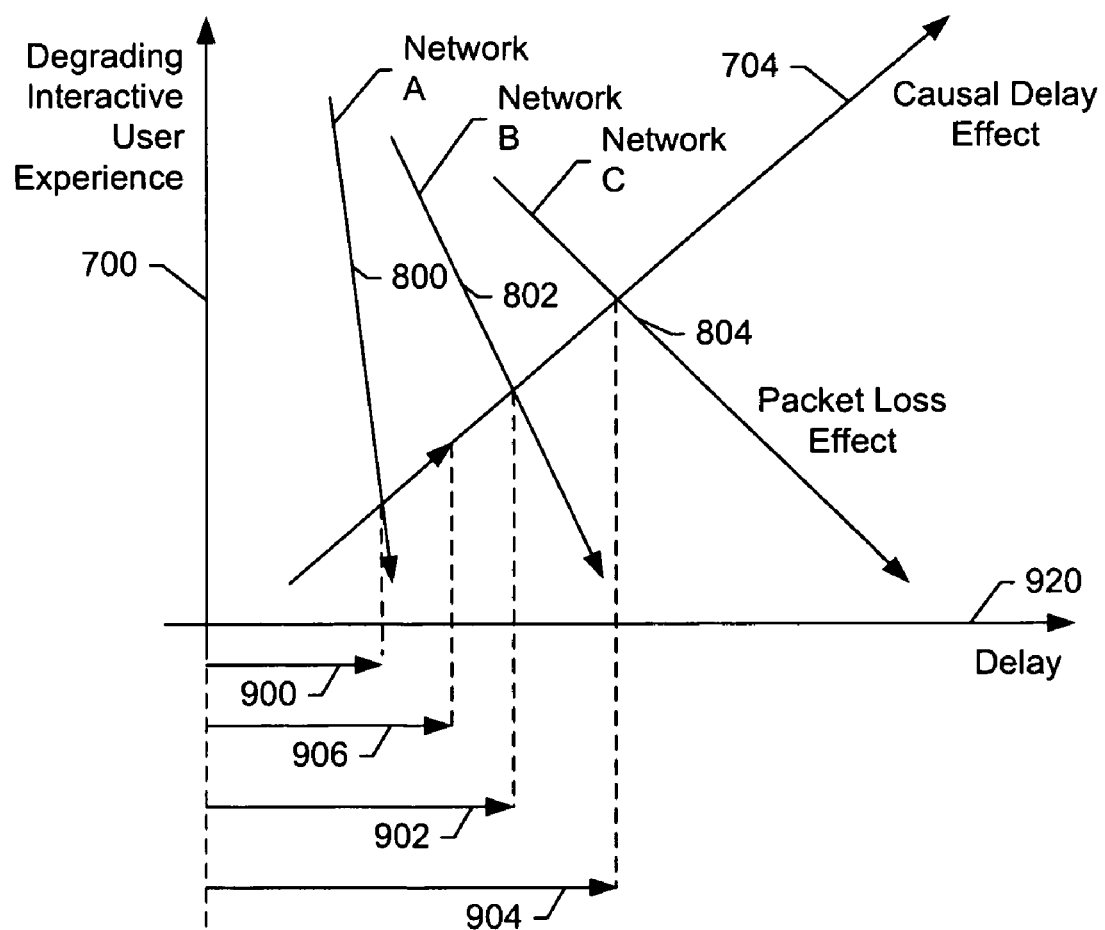
FIG. 9 shows scan line counter delay for different network types.

FIG. 9 shows scan line counter delay 920 for different network types. In one embodiment, optimum scan line counter delay 900 is set for network A (reference numeral 800), optimum delay 902 is set for network B (reference numeral 802) and optimum delay 904 is set for network C (reference numeral 804).

In an alternative embodiment, scan line counter delay 906 is conservatively set to a higher value for low latency network A 800. Delay 906 is longer than optimum delay 900 but still within human perception limits. This increases the probability of a greater quantity of packets arriving ahead of display but without degrading the interactive experience.

While preferred embodiments of the present invention have been illustrated and described in detail, it is to be understood that many changes and modifications can be made to embodiments of the present invention without departing from the spirit thereof.

What is claimed is:

1. A method of synchronizing a video signal communicated over a computer network from a first processing device to a second processing device, the video signal communicated as a plurality of packets, the second processing device having a video controller and an associated scan line counter having a value, the scan line counter controlled by a frequency of a clocking signal applied to the video controller, the method comprising:
   receiving the plurality of packets sent from the first processing device;
   decoding the packets to derive blocks of image data and display information for use by the video controller to generate a video signal, the video signal having a format used by a display device to display an image, the blocks of image data associated with scan line positions, the display information including frequency information;
   setting the video controller to operate at a first frequency associated with the frequency information;
   setting the scan line counter value to indicate a first position within a repeating sequence of scan lines, the indicated first position being a predetermined number of scan lines behind a second scan line position, the predetermined number comprising a scan line counter offset value, the second scan line position indicating a scan line corresponding to Image data received from the first processing device;
   beginning at the position within the sequence of scan lines indicated by the scan line counter, sending scan lines of image data as the video signal having a second frequency, the second frequency associated with the first frequency;
   incrementing the scan line counter to indicate successive scan lines of image data representing an image to be displayed; and
   repeatedly adjusting the first frequency.

2. The method of claim 1, wherein adjusting the first frequency results in an adjustment to the phase of the video controller so that a desired number of packets are received within a time period and decoded to produce image data before the scan line counter indicates the respective scan lines in which an image described by the produced image data is to be displayed.

3. The method of claim 2, further comprising determining the desired number of packets by analyzing a distribution of relative positions of packets received within a time period, each relative position in the distribution determined by the difference between the scan line counter value read when a packet is received and a scan line position value indicating where a portion of an image described by a block of image data contained within the packet is to be displayed.

4. The method of claim 1, wherein the scan line counter comprises a frame counter, the frame counter indicating to the video controller a scan line occurring within a sequence of frames.

5. The method of claim 1, wherein setting the scan line counter comprises determining a delay across a network connected between the first processing device and the second processing device.

6. The method of claim 5, wherein determining the number of scan lines behind the second scan position comprises correlating a scan line position to the network delay.

7. The method of claim 1, further comprising, upon detecting a last scan line in the sequence, resetting the scan line counter to a beginning position within the repeating sequence of scan lines.

8. The method of claim 1, wherein the image data is used by the second processing device to update saved scan line sections of an image.

9. The method of claim 8, further comprising displaying an image from the saved scan line sections of image data when packets are not received in time to be decoded and displayed as indicated by the scan line counter.

10. The method of claim 8, further comprising displaying an image from the saved scan line sections of image data when blocks of image data are not received.

11. The method of claim 10, further comprising receiving packets with scan line position information and no image data.

12. The method of claim 1, wherein the display information comprises display size information.

13. The method of claim 1, wherein the display information comprises pixel timing and blanking information.

14. The method of claim 1, wherein repeatedly adjusting the frequency comprises forming a relative delay histogram from the plurality of received packets, the relative delay histogram including an indication of a distribution of packet arrival times relative to an associated scan line counter value for packets in plurality of received packets, comparing the formed relative delay histogram to stored relative histograms, each stored relative histogram associated with a scan line counter offset value, and adjusting the first frequency to adjust the scan line position offset value over a time period to a scan line counter offset value associated with a stored relative histogram that matches to a threshold degree of accuracy the distribution of packet arrival times for the formed relative delay histogram.

15. The method of claim 14, wherein the indication comprises a delay value, the delay value indicating a packet arrival time.

16. The method of claim 14, wherein each stored relative histogram indicates latency characteristics of a network path between the first processing device and the second device and a delay value associated with the network path.

17. The method of claim 14, wherein the stored relative histograms are maintained in a database.

18. The method of claim 14, further comprising assigning a scan line offset value to the formed relative delay histogram and storing the formed relative delay histogram and assigned scan line offset value.

19. The method of claim 14, further comprising maintaining a list of scan line offset values, the list of scan line offset values comprising scan line offset values read from stored relative delay histograms that have matched a formed relative delay histogram.

20. The method of claim 19, wherein the list includes most-recently-used scan line offset values.

21. The method of claim 19, wherein the list includes most-often-used scan line offset values.

22. A computer-readable medium containing instructions which, when executed by a computer, synchronize a video signal communicated from a first processing device to a second processing device having a video controller and an associated scan line counter, the scan line counter having a value, the second processing device being remotely located from the first processing device by performing the acts of:

receiving the plurality of packets sent from the first processing device;

decoding the packets to derive blocks of image data and display information for use by the video controller to generate a video signal, the video signal having a format used by a display device to display an image, the blocks of image data associated with scan line positions, the display information including frequency information;

setting the video controller to operate at a first frequency associated with the frequency information;

setting the scan line counter value to indicate a first position within a repeating sequence of scan lines, the indicated first position being a predetermined number of scan lines behind a second scan line position, the predetermined number comprising a scan line counter offset value, the second scan line position indicating a scan line corresponding to image data received from the first processing device;

beginning at the position within the sequence of scan lines indicated by the scan line counter, sending scan lines of image data as the video signal having a second frequency, the second frequency associated with the first frequency;

incrementing the scan line counter to indicate successive scan lines of image data representing an image to be displayed; and repeatedly adjusting the first frequency.

23. A computer-readable medium containing instructions which, when executed by a computer, synchronize a video signal communicated from a first processing device to a second processing device having a video controller and an associated scan line counter, the scan line counter having a value, the second processing device being remotely located from the first processing device by performing the acts of:

receiving the plurality of packets sent from the first processing device;

decoding the packets to derive blocks of image data and display information for use by the video controller to generate a video signal, the video signal having a format used by a display device to display an image, the blocks of image data associated with scan line positions, the display information including frequency information;

setting the video controller to operate at a first frequency associated with the frequency information;

setting the scan line counter value to indicate a first position within a repeating sequence of scan lines, the indicated first position being a predetermined number of scan lines behind a second scan line position, the predetermined number comprising a scan line counter offset value, the second scan line position indicating a scan line corresponding to image data received from the first processing device;

beginning at the position within the sequence of scan lines indicated by the scan line counter, sending scan lines of image data as the video signal having a second frequency, the second frequency associated with the first frequency;

incrementing the scan line counter to indicate successive scan lines of image data representing an image to be displayed; and repeatedly adjusting the second processing device's video controller frequency, by forming a relative delay histogram from the plurality of received packets, the relative delay histogram including an indication of a distribution of packet arrival times for packets in plurality of received packets, comparing the formed relative delay histogram to stored relative histograms, each stored relative histogram associated with a scan line counter offset value, and adjusting the second processing device's video controller frequency to adjust the second processing device's scan line position offset value over a time period to a scan line counter offset value associated with a stored relative histogram that matches to a threshold degree of accuracy the distribution of packet arrival times for the formed relative delay histogram.

24. An apparatus configured to synchronize a video signal communicated from a processing device over a computer network, the apparatus having a video display, a video controller and an associated scan line counter, the scan line counter having a value, the apparatus comprising:

means for receiving the plurality of packets sent from the first processing device; means for decoding the packets to derive blocks of image data and display information for use by the video controller to generate a video signal, the video signal having a format used by a display device to display an image, the blocks of image data associated with scan line positions, the display information including frequency information;

means for setting the video controller to operate at a first frequency associated with the frequency information;

means for setting the scan line counter value to indicate a first position within a repeating sequence of scan lines, the indicated first position being a predetermined number of scan lines behind a second scan line position, the predetermined number comprising a scan line counter offset value, the second scan line position indicating a scan line corresponding to image data received from the processing device;

means for, beginning at the position within the sequence of scan lines indicated by the scan line counter, sending scan lines of image data as the video signal having a second frequency, the second frequency associated with the first frequency;

means for incrementing the scan line counter to indicate successive scan lines of image data representing an image to be displayed; and means for repeatedly adjusting the first frequency.

25. The apparatus of claim 24, further comprising:

a relative delay histogram, the relative delay histogram including an indication of a distribution of packet arrival times for packets in the plurality of received packets;

a plurality of stored relative histograms, each stored relative histogram associated with a scan line counter offset value;

means for comparing the formed relative delay histogram to the stored relative histograms; and means for adjusting the video controller frequency to adjust the scan line position offset value over a time period to a scan line counter offset value associated with a stored relative histogram that matches to a threshold degree of accuracy the distribution of packet arrival times for the formed relative delay histogram.

* * * * *

UNITED STATES PATENT AND TRADEMARK OFFICE
CERTIFICATE OF CORRECTION

| | |
|---|---|
| PATENT NO. | : 7,516,255 B1 |
| APPLICATION NO. | : 11/284676 |
| DATED | : April 7, 2009 |
| INVENTOR(S) | : David Hobbs |

It is certified that error appears in the above-identified patent and that said Letters Patent is hereby corrected as shown below:

Column 15, line 15, delete "from the first processing device;" and insert -- from the processing device; --.

Signed and Sealed this

Thirtieth Day of June, 2009

JOHN DOLL
*Acting Director of the United States Patent and Trademark Office*